(12) United States Patent
Rehn et al.

(10) Patent No.: US 7,561,421 B2
(45) Date of Patent: Jul. 14, 2009

(54) PORTABLE ELECTRONIC PRODUCT WITH A QWERTY KEYBOARD

(75) Inventors: Christopher Chongbin Rehn, Taipei (TW); Chi-Hsiung Lin, Taipei (TW); Hsiang-Ti Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 245 days.

(21) Appl. No.: 11/447,096

(22) Filed: Jun. 6, 2006

(65) Prior Publication Data

US 2007/0146983 A1 Jun. 28, 2007

(30) Foreign Application Priority Data

Dec. 23, 2005 (TW) ............................... 94222557 U (51) Int. Cl.
*G06F 1/16* (2006.01)
*H05K 5/00* (2006.01)
*H05K 7/00* (2006.01)

(52) U.S. Cl. ..................................................... 361/680

(58) Field of Classification Search ......... 361/679–684, 361/686
See application file for complete search history.

(56) References Cited

U.S. PATENT DOCUMENTS

| 6,813,143 | B2 | 11/2004 | Mäkelä |
| 7,187,364 | B2 * | 3/2007 | Duarte et al. ............... 345/168 |
| 2007/0065220 | A1 * | 3/2007 | Kemppinen ................. 400/682 |

* cited by examiner

*Primary Examiner*—Javaid Nasri
(74) *Attorney, Agent, or Firm*—Rosenberg, Klein & Lee (57) ABSTRACT

A portable electronic product with a Qwerty keyboard has a single display for reducing the manufacturing cost and a Qwerty keyboard for inputting data more conveniently. The portable electronic product includes a housing, a Qwerty keyboard mounted in the housing and a display. The Qwerty keyboard is exposed to a bottom surface of the housing and has an outer surface that is lower than the bottom surface of the housing. The display is assembled on a top surface of the housing and has a side edge that is partially or fully mounted with one edge of the housing pivotally. Therefore, the display is able to swivel relative to the housing. When the user needs to input data, the display can be turned to a position that simultaneously faces to the user with the Qwerty keyboard.

11 Claims, 6 Drawing Sheets

PORTABLE ELECTRONIC PRODUCT WITH A QWERTY KEYBOARD

FOREIGN APPLICATION PRIORITY DATA

Dec. 23, 2005 (TW) 94222557.

BACKGROUND OF THE INVENTION

1. Field of the Invention

The present invention relates to a portable electronic product with a Qwerty keyboard, and in particular to a portable electronic product that not only has communication function but is also equipped with a Qwerty keyboard for inputting data conveniently.

2. Description of Related Art

Today there are many common portable electronic products, such as PDAs (personal digital assists), mobile phones, portable application products, multi-media application products etc., there are even mobile phones combined with PDAs. Some portable electronic products are equipped with a keyboard for inputting data. However the equipped keyboard is usually small and is inconvenient for inputting data, and it often results in typing errors being committed by the user. Some portable electronic products can connect with an external Qwerty keyboard, but the user needs to bring the external Qwerty keyboard causing additional inconveniences.

To improve the inputting performance of portable electronic products, portable electronic products of the prior art are usually combined with keyboards. For example, U.S. Pat. No. 6,813,143 published in Nov. 2, 2004 reveals a "Mobile device featuring 90 degree rotatable front cover for covering or revealing a keyboard". The mobile device has a housing having a keyboard, a front cover having a display and at least one corner, and a hingeable mounting assembly for rotatably coupling the front cover to the housing for covering or revealing the keyboard entirely.

However the above-mentioned prior art has the disadvantages described as follows:

1. The front cover only connects with the housing via the hingeable mounting assembly at a corner thereof. The structure is not solid. Moreover, a connecting cable for connecting the housing with the display on the front cover needs to pass through the hingeable mounting assembly, it is very difficult to assemble and arrange the connecting cable.
2. The front cover can only rotate relative to the housing and cannot swivel, because the front cover only rotates around the hinge that joins the front panel and the body of the device. It cannot swivel around any other axis. Therefore, the included angle between the keyboard and the display is fixed and is not adjustable. The visual angle of the display is limited and is not adjustable when the user is inputting data.

Accordingly, the present invention aims to propose a portable electronic product with a Qwerty keyboard that solves the above-mentioned problems in the prior art.

SUMMARY OF THE INVENTION

An object of the present invention is to provide a portable electronic product with a Qwerty keyboard at its bottom. The purpose is to simplify the overall structure and allow the inputting of data to be more convenient and faster to a user. The aforesaid product also has a single display that is adjustable and has an included angle relative to the keyboard, which makes it more convenient for use and also reduces the cost of the portable electronic product.

Another object of the present invention is to provide a portable electronic product with a Qwerty keyboard which can rotate relative to the display so that the user can view the display while inputting data. Moreover, the Qwerty keyboard of the present invention is assembled at the bottom in a hidden way, and the connecting structure between the display and the Qwerty keyboard is solid and is it easy to arrange the cable.

To achieve the first object described above, the present invention provides a portable electronic product with a Qwerty keyboard, which includes a housing, a Qwerty keyboard and a display. The housing has a Qwerty keyboard disposed in the housing and exposed to a bottom surface of the housing. The Qwerty keyboard has a surface that is lower than the bottom surface of the housing. The Qwerty keyboard has letters that are printed thereon and arranged perpendicular to a pivotal side of the housing. The display is disposed on a top surface of the housing. The pivotal side of the housing is partially or fully mounted pivotably with one side of the display, thereby the display is able to swivel relative to the housing along the pivotal side as a pivotal axle. When the user is not inputting data, the bottom surface of the display closed to the top surface of the housing. When the user needs to input data, the display can be swiveled to face the user so that both the Qwerty keyboard and the display face the user directly for inputting data.

To achieve the second object described above, the present invention provides a portable electronic product with a Qwerty keyboard, further comprising a backlight source adjacent to the Qwerty keyboard and a backlight switch disposed between the display and the housing, the backlight switch is for switching the backlight source on or off. The Qwerty keyboard has a semiopaque protective layer disposed at an outside thereof. When the backlight source is turned off, the Qwerty keyboard is shielded by the protective layer and is hidden under the protective layer. When the backlight source is turned on, the Qwerty keyboard appears through the protective layer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention can be fully understood from the following detailed description and preferred embodiment with reference to the accompanying drawings, in which.

DETAILED DESCRIPTION OF THE PREFERRED EMBODIMENTS

The following is a detailed description of the best presently contemplated modes of carrying out the invention. This description is not to be taken in a limiting sense, and is made merely for the purpose of illustrating general principles of embodiments of the invention. The scope of the invention is best defined by the appended claims.

Figure 1:
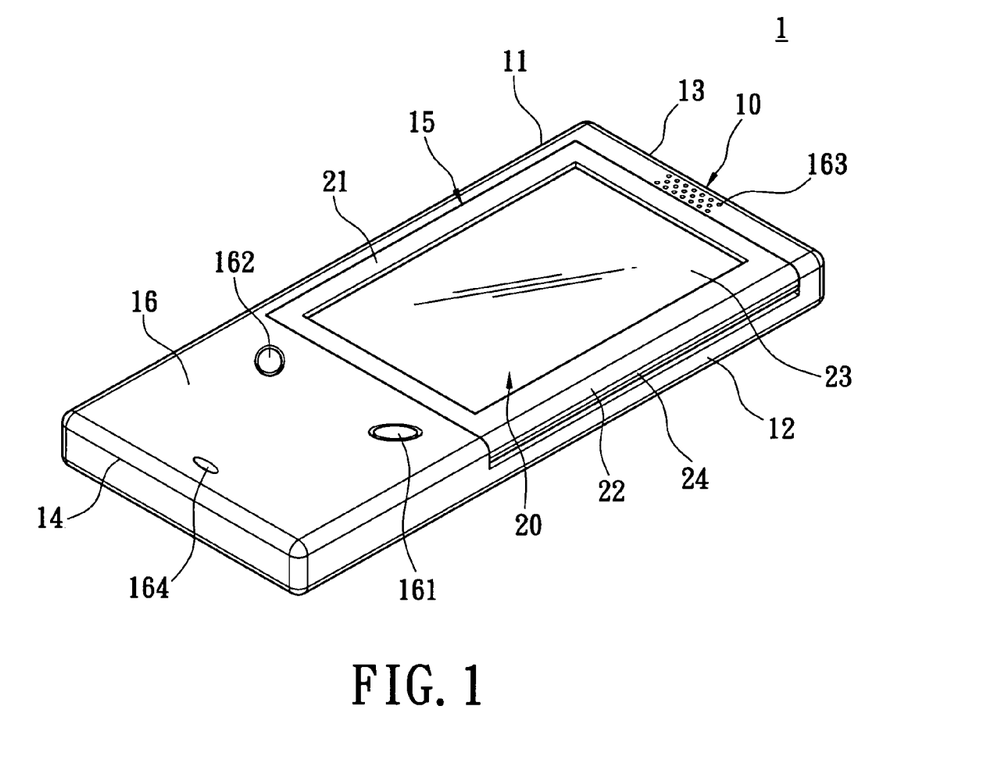
FIG. 1 is a perspective view of a portable electronic product with a Qwerty keyboard of the first embodiment according to the present invention.
Figure 2:
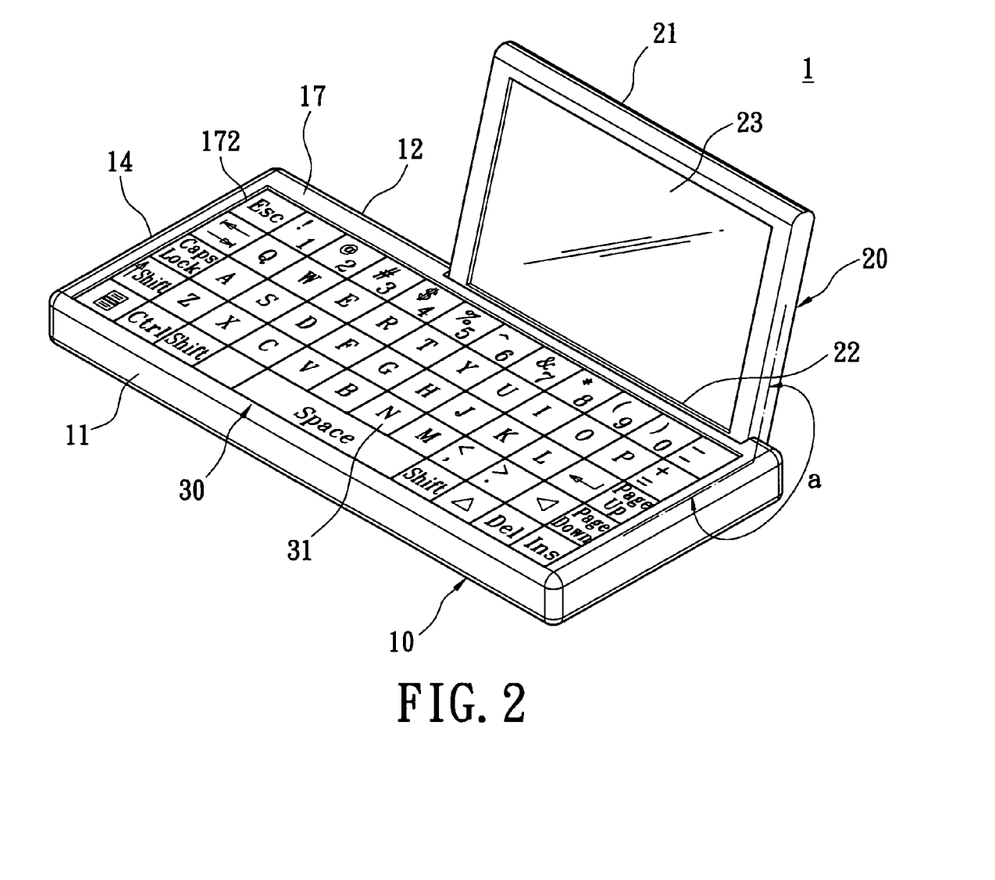
FIG. 2 is a perspective view of a portable electronic product with a Qwerty keyboard of the first embodiment in an operating condition according to the present invention.

Reference is made to FIGS. 1-2, which are perspective views of a portable electronic product with a Qwerty keyboard of the first embodiment in a closed condition and a swiveled condition according to the present invention. The present invention provides a portable electronic product with a Qwerty keyboard 1, which includes a housing 10, a display 20 and a Qwerty keyboard 30. The display 20 is disposed on a top surface of the housing 10. The Qwerty keyboard 30 is assembled in the housing 10.

In this first embodiment, the portable electronic product 1 has a rectangular shape, and also has a pair of parallel lengthwise sides 11, 12 and a pair of lateral sides 13, 14. However, the present is not limited in such a form, for example, the portable electronic product can be square shaped. The portable electronic product 1 of this embodiment has the communication functions of a mobile phone, and a top surface 16 of the portable electronic product 1 has a speaker 163 and a receiver 164 and is equipped with function keys 161, 162.

The display 20 has a side 22 that is connected pivotably to one of the lengthwise side 12. As shown in FIG. 2, the Qwerty keyboard 30 has letters (or symbols) 31 that are printed thereon and arranged perpendicular to a pivotal side 12 of the housing 10. In this embodiment the present invention designates the side 12 as the pivot side. As shown in FIG. 1, the present invention provides a pivotal axle 24 between the display 20 and the housing 10, so that the display 20 can be swiveled as shown in FIG. 2. In addition, having such a structure makes it easy to arrange the connecting cable between the display 20 and the housing 10.

Reference is made to FIG. 2. The Qwerty keyboard 30 is mounted in the housing 10 and exposed to a bottom surface 17 of the housing 10. The Qwerty keyboard 30 has an exposed surface that is lower than the bottom surface 17 of the housing 10. In this embodiment, the housing 10 is concaved with a depression 172 from the bottom surface 17. The Qwerty keyboard 30 is disposed in the depression 172, thereby such a structure prevents the keyboard 30 from rubbing against a table when the portable electronic product 1 is disposed on a table.

Through the above-mentioned structure, the display 20 of the present invention is pivotably mounted on the housing 10 along the side 12 which is a pivotal axle (not shown in the Figure). When the user does not need to input information, the bottom surface of the display 20 is close to the top surface of the housing 10. When the user needs to input information, the display 20 can be swiveled to face the user and the Qwerty keyboard 30 also simultaneously faces the user.

It is not so frequently for user to input data to the portable electronic product via a keyboard. Nevertheless, the portable electronic product of prior art is usually limited in that it lacks a Qwerty keyboard for inputting data, when user needs to input data. One of the characteristics of the present invention is that, the display 20 of the portable electronic product 1 is usually close to the top surface of the housing 10 when the portable electronic product 1 is being used in its most common situations, such as when it is functioning as a mobile phone. The display 20 can be swiveled outside along the pivotal axle to face the user, so that the display 20 and the Qwerty keyboard 30 can face to the user simultaneously when the user needs to input data. As shown in FIG. 2, there is an included angle between the display 20 and the housing 10. A preferred range of the included angle is between 0 degree to 270 degrees, so that the user can adjust the viewing angle of the display 20. The pivotal axle structure provides a predetermined friction force for fixing the display 20 relative to the housing 10, so that the display 20 of the present invention can be easily fixed at any included angle relative to the housing 10.

In this embodiment, the display 20 has a pair of sides 21, 22. The side 22 pivotably mounted on the housing 10 is shorter than the lengthwise side 12 of the housing 10. The housing 10 is formed with a receiving space 15 (as shown in FIG. 1) for receiving the display 20, and the display 20 has a top surface 23 that is aligned with a top surface 16 of the housing 10. The advantage of such structure is that the pivotal axle 24 can be smaller and shorter, and the total thickness of the portable electronic product 1 can be thinner.

As shown in FIG. 2, the Qwerty keyboard 30 is formed with letters 31 thereon and the letters 31 are arranged to perpendicular to the side 12 between the display 20 and the housing 10. Moreover, the Qwerty keyboard 30 fully utilizes the space at the bottom surface 17 of the portable electronic product 1 that is rarely used in prior art. In the present invention, the Qwerty keyboard 30 is disposed at the bottom surface 17 of the portable electronic product 1 and usually faces away from the display 20 when the portable electronic product 1 is being used in its most common situations, such as when it is functioning as a mobile phone. When the user needs to input data, only the display 20 needs to be swiveled along with the pivotal axle 24 (shown in FIG. 2) and then both the display 20 and the Qwerty keyboard 30 can face to the user simultaneously. The user can input data conveniently via the Qwerty keyboard 30 when operating the portable electronic product.

Figure 3:
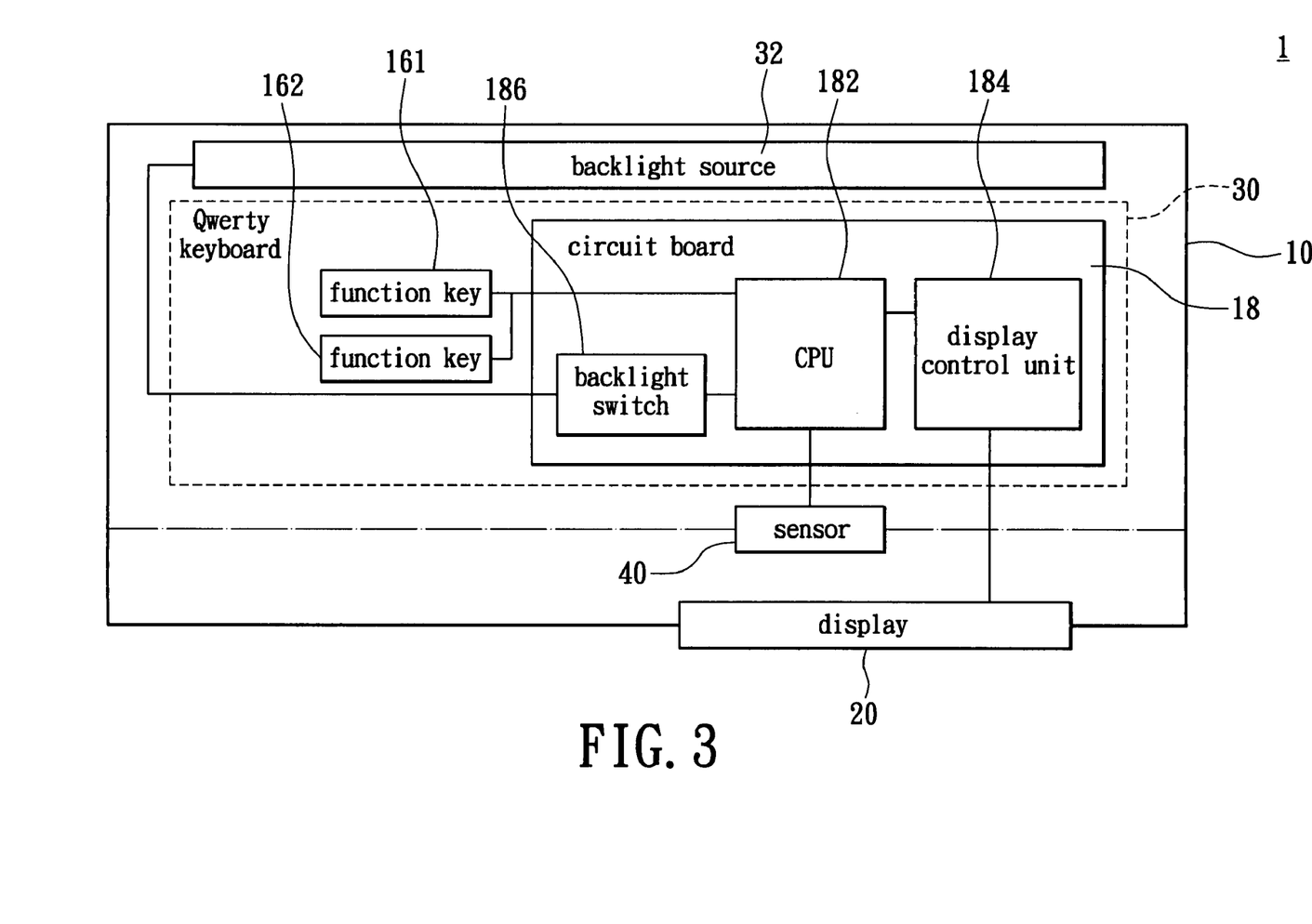
FIG. 3 is an overview of the structure in block diagram form of a portable electronic product with a Qwerty keyboard according to the present invention.

Reference is made to FIG. 3, which is a structure block diagram of a portable electronic product with a Qwerty keyboard according to the present invention. The housing 10 has a circuit board 18 mounted therein. The circuit board 18 has a CPU 182 and a display control unit 184 for controlling the displaying direction of the display 20. A sensor 40 is disposed between the housing 10 and the display 20. When the display 20 is swiveled, the sensor 40 transmits an actuating signal to the CPU 182 for actuating the display control unit 184; Therefore, the displaying direction of the display 20 can be changed. The sensor 40 can be a mechanical actuating switch or a magnetic induction switch, etc.

It should be noted that the above-mentioned is only one preferred embodiment according to the present invention, and any software or mechanical designing can achieve the transformation of the displaying direction of the display 20, or a button can be provided for the user to adjust the displaying direction of the display 20 is not limited by this example.

The Qwerty keyboard 30 of the present invention could be an electronic-type touch keyboard or a mechanical-type keyboard. For operating conveniently in an environment lacking light, the portable electronic product 1 has a backlight source 32 electrically connected to the circuit board 18. The backlight source 32 in FIG. 3 is shown as a block, but in practice it can include an LED light source, a diffusion sheet, a light guiding plate (LGP) or a reflection sheet. When the Qwerty keyboard 30 is not in use, the backlight source 32 is turned off to reduce power consumption.

In the present invention, a backlight switch 186 is disposed between the backlight source 32 and the CPU 182. When the display 20 is turned outward, the actuating signal transmitted from the sensor 40 can further conduct the backlight switch 186 through the CPU 182, thereby automatically turning on the backlight source 32.

Figure 4:
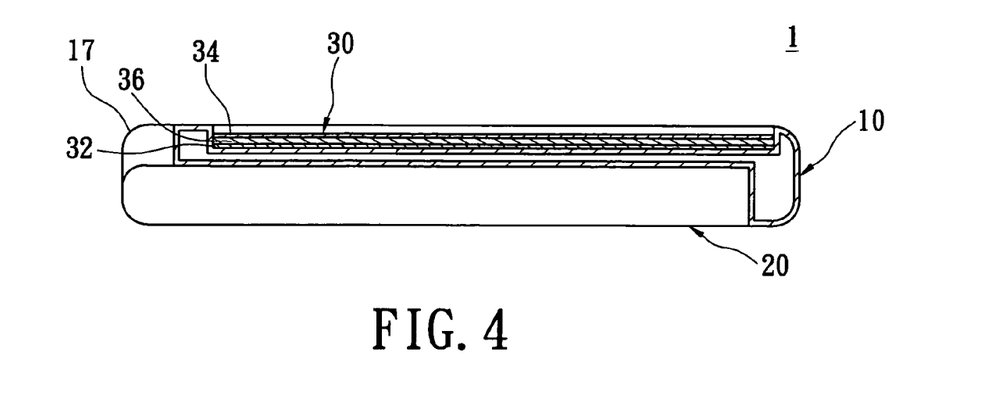
FIG. 4 is a cross-sectional view of a portable electronic product with a Qwerty keyboard having a hidden keyboard according to the present invention.

In the present invention, the Qwerty keyboard 30 can be designed in a hidden way at the bottom surface 17 of the housing 10. Reference is made to FIG. 4, which is a cross-sectional view of a hidden-type keyboard according to the present invention. In this embodiment, an electronic-type touch keyboard 30 is shown to illustrate how the keyboard is disposed at the bottom surface 17 of the housing 10 in a hidden way. The hidden electronic-type touch keyboard 30 includes the backlight source 32, a protective layer 34, and a touch panel 36 disposed under the protective layer 34. The protective layer 34 is formed with a flat outer surface. The touch panel 36 can have various types, such as including a pair of conductive layers and a plurality of spacers disposed between the pair of conductive layers.

The backlight source 32 is disposed under the touch panel 36. The protective layer 34 is preferably made of semiopaque and hard-wearing material. The letters 31 or pattern of the keyboard 30 can be printed on the top surface of the touch panel 36 or the inner side of the protective layer 34.

When the backlight source 32 is turned off, the Qwerty keyboard 30 is shielded by the protective layer 34 and is hidden under the protective layer 34. The user cannot see the letters 31 or pattern of the Qwerty keyboard 30. This means the user cannot see the keyboard 30 in this situation. When the backlight source 32 is turned on, the light passes through the touch panel 36 and the protective layer 34. Therefore, the letters 31 or the pattern of the Qwerty keyboard 30 can appear outside. In other words, the user can see the Qwerty keyboard 30. According to the above-mentioned design, the Qwerty keyboard 30 is ordinarily hidden, but it can appear when the user needs to input data.

Figure 5:
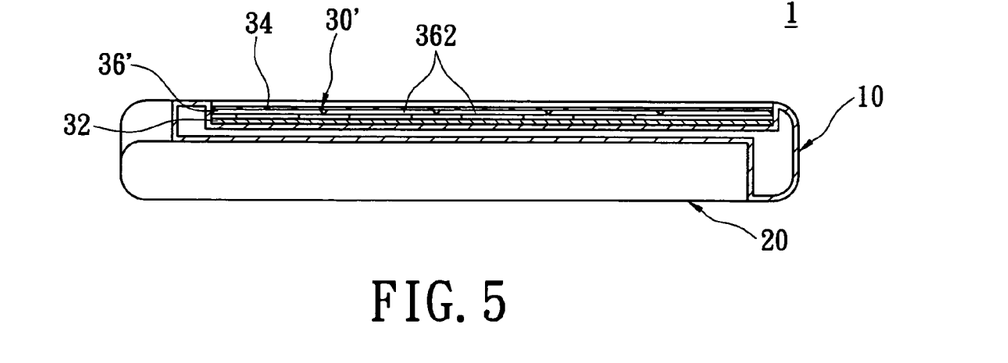
FIG. 5 is a cross-sectional view of a portable electronic product with a Qwerty keyboard having a hidden keyboard of a second embodiment according to the present invention.

Reference is made to FIG. 5, which is a cross-sectional view of a hidden-type keyboard of another embodiment according to the present invention. The keyboard 30 in this embodiment is a mechanical-type keyboard. The semiopaque protective layer 34 covers a mechanical key layer 36 All keys 362 of the mechanical key layer 36 can be made of light-pervious material, so that light can pass through the keys 362 and the protective layer 34. In this embodiment, letters 31 can be printed on the keys 362 of the mechanical key layer 36' on the inner side of the protective layer 34. When the letters 31 are printed on the inner side of the protective layer 34, the keyboard 30 can be more easily manufactured.

For avoiding unintended inputting of data to the keyboard 30, the portable electronic product 1 with a Qwerty keyboard of the present invention can lock the keyboard 30 via software/firmware and functional shortcut keys.

Figure 6:
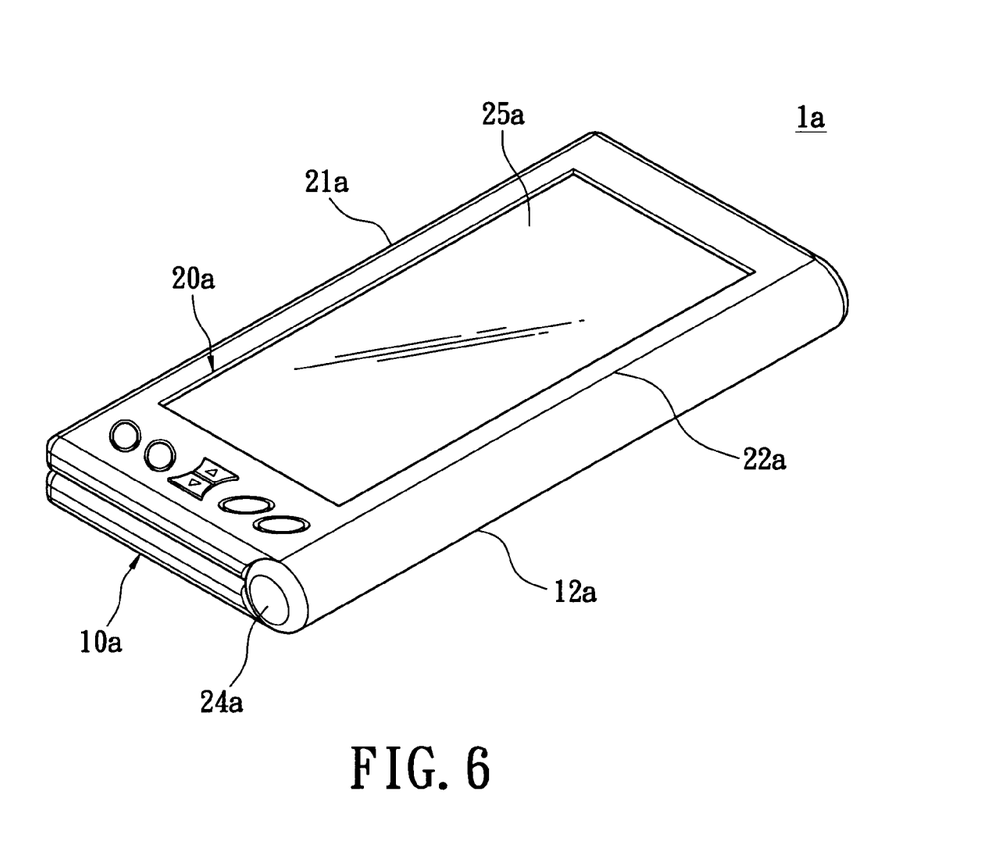
FIG. 6 is a perspective view of a portable electronic product with a Qwerty keyboard of the second embodiment according to the present invention.
Figure 7:
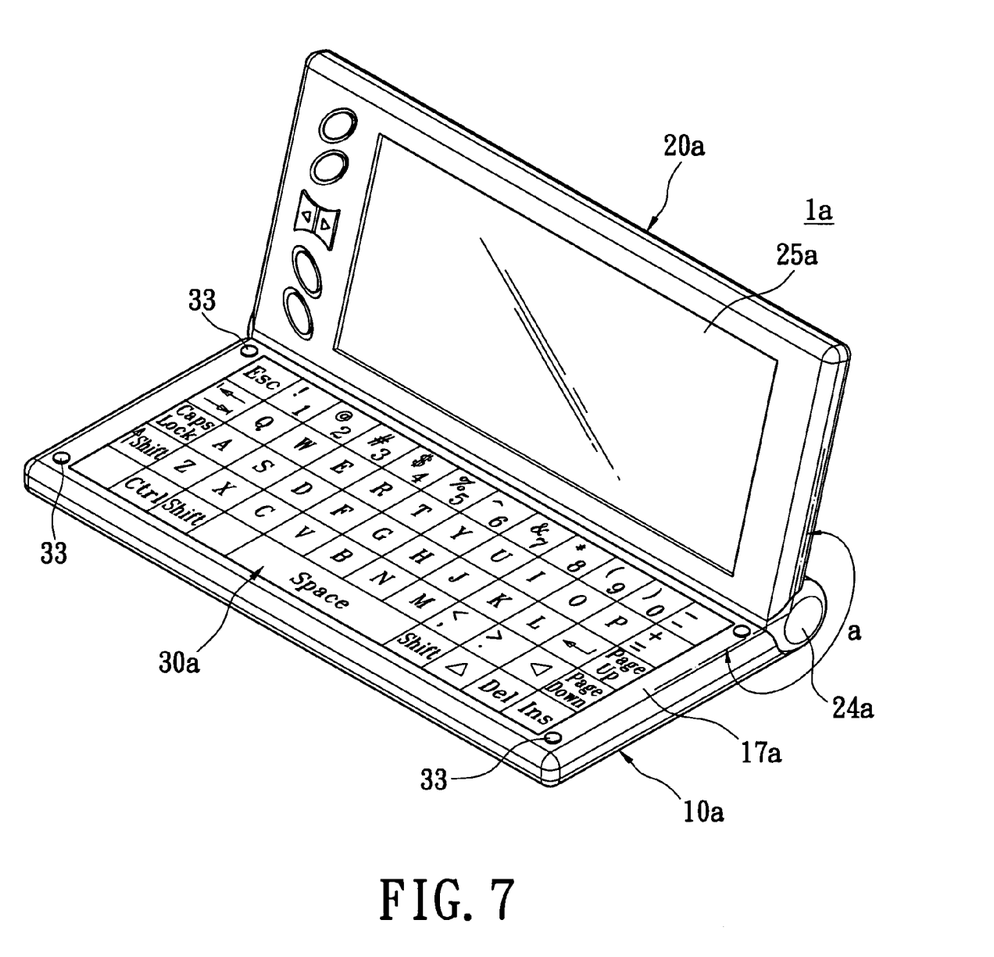
FIG. 7 is a perspective view of a portable electronic product with a Qwerty keyboard of the second embodiment in an operating condition according to the present invention.

Reference is made to FIGS. 6 and 7, which are respectively a perspective view and an operating view of a portable electronic product with a Qwerty keyboard of a second embodiment according to the present invention. This second embodiment is substantially the same as the first embodiment. The portable electronic product la of second embodiment has a housing 10a and a cover 20a fully covered on the top surface of the housing 10a. The cover 20 has a display 25a, and a pair of sides 21a, 22a. The cover 20a is fully mounted to the side 12a of the housing 10a via a pivotal axle 24a in a pivotal way. This second embodiment has advantages of the display 25a having a larger screen area for displaying more information. The area of the display 25a is substantially the same as the cover 20a. Therefore, it can be applied to various electronic products, such as a personal digital assistant (PDA).

For avoiding the keyboard 30a from rubbing against a top surface of the desk, the housing 10a has a plurality of anti-slippery pads 33 protruding from the bottom surface 17a.

As described above, the present invention has the following advantages:

1. The present invention is equipped with a single display for reducing the manufacturing cost and a Qwerty keyboard so that the user can quickly and conveniently input data, and the included angle between the display and the keyboard is adjustable so that it can be viewed comfortably.

2. The present invention has a stable connecting structure between the display and the Qwerty keyboard, so it is easy to arrange the connecting cable.

3. The keyboard of the present invention is formed with a protective layer, which not only hides the keyboard but also protects the keyboard.

4. The present invention provides two embodiments. In first embodiment, the side of the display is shorter than the lengthwise side of the housing. The pivotal axle between the display and the housing can be smaller, so that the total thickness of the portable electronic product can be thinner. The second embodiment provides the cover 20a that fully covers the top surface of the housing 10a, so that it provides a larger display 25a.

While the invention has been described with reference to the preferred embodiments, the description is not intended to be construed in a limiting sense. It is therefore contemplated that the appended claims will cover any such modifications or embodiments as may fall within the scope of the invention defined by the following claims and their equivalents.

What is claimed is:

1. A portable electronic product with a Qwerty keyboard, comprising:
    a housing having opposed top and bottom surfaces, and a Qwerty keyboard disposed to overlay a substantial portion of one of said top and bottom surfaces of said housing, said Qwerty keyboard having an exposed surface being recessed within said one of said top and bottom surfaces of said housing; and
    a display, disposed on the other of said top and bottom surfaces of said housing, said display being pivotally coupled to said housing to overlay a portion of the other of said top and bottom housing surfaces in a first operational position, said display being pivotally displaceable relative to said housing to a second operational position at the opposed one of the top and bottom housing surfaces for operation thereat responsive to said Qwerty keyboard actuation, whereby when a user is not inputting data, a bottom surface of said display is closed in said first operational position; and when the user needs to input data, said display is pivotally displaced to said second operational position adjacent said Qwerty keyboard so that the user can view said display while inputting data.

2. The portable electronic product with a Qwerty keyboard as in claim 1, wherein an included angle between said display and said housing is 0 degrees to 270 degrees.

3. The portable electronic product with a Qwerty keyboard as in claim 1, wherein said housing is formed with a receiving space for receiving said display, and said display has a top surface aligned to said top surface of said housing.

4. The portable electronic product with a Qwerty keyboard as in claim 1, wherein said housing has a circuit board mounted therein, said circuit board has a CPU and a display control unit for controlling a displaying direction of said display.

5. The portable electronic product with a Qwerty keyboard as in claim 4, wherein a sensor is disposed between said housing and said display, when said display is rotated outward, said sensor transmits an actuating signal to said CPU for actuating said display control unit to swivel the displaying direction of said display.

6. The portable electronic product with a Qwerty keyboard as in claim 1, further comprising a backlight source adjacent to said Qwerty keyboard and a backlight switch disposed between said display and said housing, said backlight switch switches said backlight source on or off.

7. The portable electronic product with a Qwerty keyboard as in claim 6, wherein said Qwerty keyboard further comprises a semi-opaque protective layer disposed at an outer side thereof, whereby when said backlight source is turned off, said Qwerty keyboard is shielded by said protective layer and substantially hidden under said protective layer, and when said backlight source is turned on, said Qwerty keyboard is visible through said protective layer.

8. The portable electronic product with a Qwerty keyboard as in claim 7, wherein said Qwerty keyboard has an electronic touch panel disposed under said protective layer, said Qwerty keyboard includes characters printed on at least one of an inside surface of said protective layer and a top surface of said electronic touch panel.

9. The portable electronic product with a Qwerty keyboard as in claim 7, wherein said Qwerty keyboard has a mechanical key layer disposed under said protective layer, said letters of said Qwerty keyboard are printed on an inside surface of said protective layer or a top surface of said mechanical key layer.

10. The portable electronic product with a Qwerty keyboard as in claim 1, wherein said bottom surface of said housing is concaved with a depression, said Qwerty keyboard is disposed in said depression.

11. The portable electronic product with a Qwerty keyboard as in claim 1, wherein said bottom surface of said housing has a plurality of anti-slip pads protruding therefrom.

* * * * *